(12) United States Patent
Sanford, Jr.

(10) Patent No.: US 9,079,458 B2
(45) Date of Patent: Jul. 14, 2015

(54) TIRE BLOCKS

(71) Applicant: Kenneth B. Sanford, Jr., Tacoma, WA (US)

(72) Inventor: Kenneth B. Sanford, Jr., Tacoma, WA (US)

(*) Notice: Subject to any disclaimer, the term of this patent is extended or adjusted under 35 U.S.C. 154(b) by 349 days.

(21) Appl. No.: 13/655,350

(22) Filed: Oct. 18, 2012

(65) Prior Publication Data

US 2013/0092305 A1   Apr. 18, 2013

Related U.S. Application Data

(60) Provisional application No. 61/548,544, filed on Oct. 18, 2011.

(51) Int. Cl.
*B60C 17/06* (2006.01)
*B60C 5/00* (2006.01)

(52) U.S. Cl.
CPC .............. *B60C 17/065* (2013.04); *B60C 5/002* (2013.01); *Y10T 29/49492* (2015.01); *Y10T 152/10297* (2015.01)

(58) Field of Classification Search
CPC ...... B60C 17/06; B60C 17/065; B60C 5/002; B60C 7/102
USPC ......... 152/246, 300, 301, 306, 310, 311, 312, 152/313, 314, 316; 29/894.3
See application file for complete search history.

(56) References Cited

U.S. PATENT DOCUMENTS

| | | | | | |
|---|---|---|---|---|---|
| 545,148 | A | * | 8/1895 | Best | 152/312 |
| 805,591 | A | * | 11/1905 | Davison et al. | 152/310 |
| 1,260,384 | A | * | 3/1918 | Huebner | 156/79 |
| 1,343,233 | A | * | 6/1920 | Stander | 152/288 |
| 1,410,475 | A | * | 3/1922 | Johnston | 152/315 |
| 1,468,035 | A | * | 9/1923 | Schwendler | 152/316 |
| 1,985,187 | A | * | 12/1934 | Miller | 152/316 |
| 3,485,283 | A | * | 12/1969 | Pomeroy et al. | 152/158 |
| 5,073,444 | A | * | 12/1991 | Shanelec | 428/313.5 |
| 2007/0056668 | A1 | * | 3/2007 | Sandstrom | 152/310 |
| 2007/0056669 | A1 | * | 3/2007 | Sandstrom et al. | 152/310 |

FOREIGN PATENT DOCUMENTS

| | | | |
|---|---|---|---|
| DE | 1936526 A1 | * | 3/1970 |
| FR | 2249781 A1 | * | 5/1975 |
| WO | WO 0043224 A1 | * | 7/2000 |

* cited by examiner

*Primary Examiner* — Kip T Kotter
(74) *Attorney, Agent, or Firm* — Wolfe-SBMC

(57) ABSTRACT

Tire blocks are described. The techniques described herein may enable multiple blocks of foam to substantially fill an inside of a tire. Each of the blocks used to fill a tire may have a wedge shape and a rigidity that is sufficient to operate the tire without air pressure. The wedge shape of each of the tire blocks has sides that may be positioned at least partially against sidewalls of the tire and sides that may be positioned against other blocks of foam. The tire can then be inflated to the desired air pressure for operation. Because of the density of the foam and the wedge shape design, a failed tire can still be used for normal operation.

20 Claims, 5 Drawing Sheets

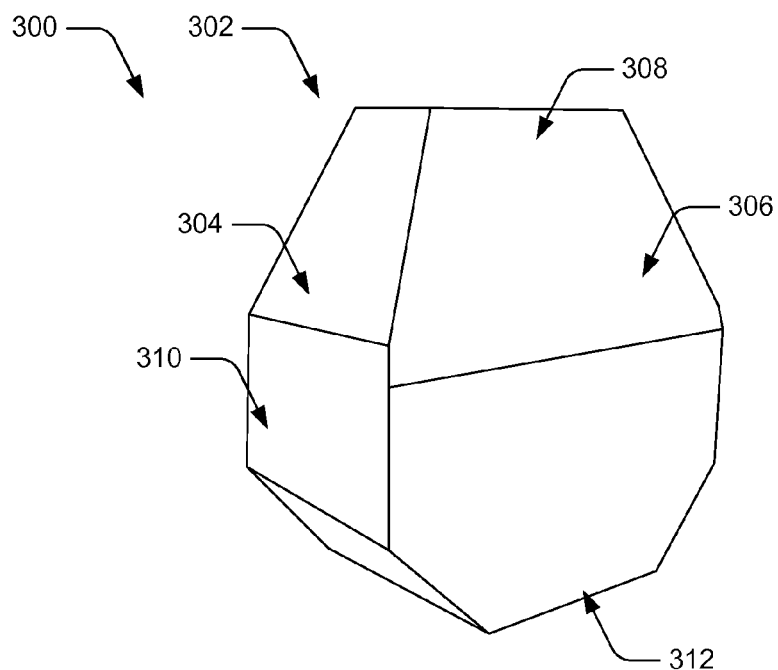
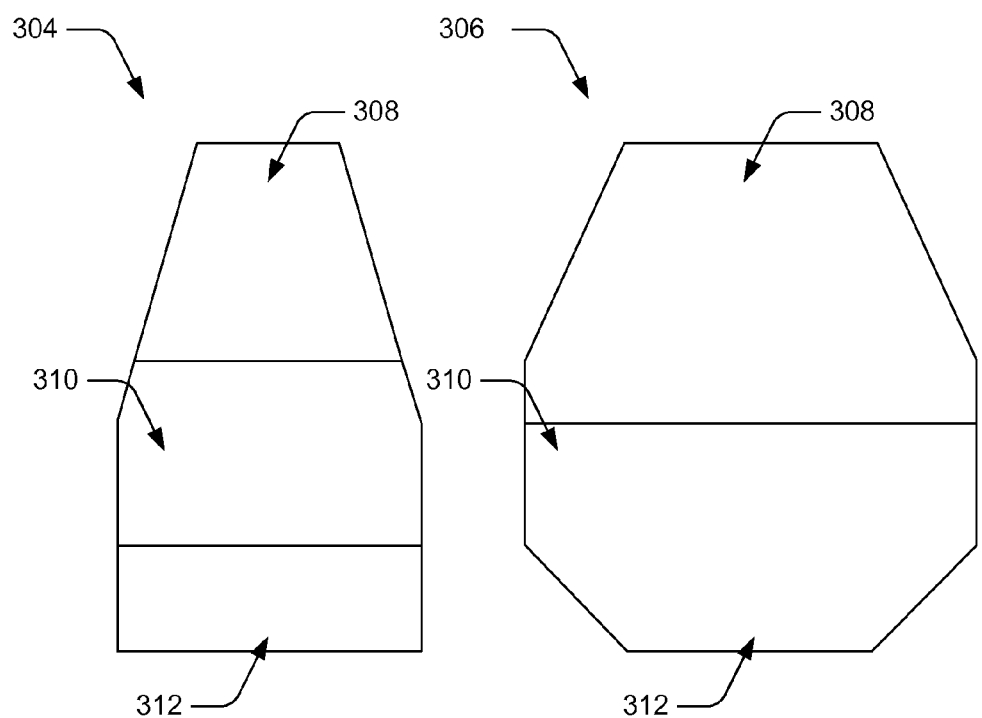

500

502
Lubricate a plurality of wedge shaped foam blocks that are configured to fill an inside of a tire

504
Position at least some said foam blocks within the inside of the tire

506
Spread the at least some said foam blocks to form space for one or more other said foam blocks, the spreading causing the at least some said foam blocks to be compressed

508
Position the one or more other said foam blocks in the space formed by the spreading

Fig. 5

TIRE BLOCKS

RELATED APPLICATION

This application claims priority to U.S. Provisional Application Ser. No. 61/548,544 filed Oct. 18, 2011, entitled "Tire Blocks", the disclosure of which is hereby incorporated by reference in its entirety.

BACKGROUND

Oftentimes objects present on roadways and on other paths taken by a vehicle are capable of puncturing tires of the vehicle. When a tire is punctured by such objects, the tire may lose the ability, in some cases suddenly and in other cases over an extended period of time, to maintain sufficient air pressure for operation of the tire. In either type of case, however, such air loss may result in a "flat tire," a dangerous condition that may damage the vehicle and could result in a harmful situation for occupants of the vehicle. In racing applications, flat tires may force a competitor to spend extra time in "the pit" changing the tire. Having to change a tire however may jeopardize the competitor's chances of winning the race. In recreational applications, a flat tire may at the very least be time consuming.

Some approaches for maintaining operability of a compromised tire involve inserting other objects inside the tire. However, many conventional approaches are often also designed as a temporary solution that enables a vehicle with a compromised tire to travel to a location where the tire can be fixed and where air pressure can be restored. Relying on conventional approaches to maintain operability of the tire under typical use of the vehicle for extended periods of time, therefore, may be undesirable.

SUMMARY

Tire blocks are described. In one or more implementations, an apparatus comprising a plurality of blocks of foam that are configured to substantially fill an inside of a tire are described. Each of the plurality of blocks has a wedge shape and a rigidity that is sufficient to operate the tire without air pressure. The wedge shape of the tire blocks has sides that are configured to be positioned at least partially against sidewalls of the tire and sides that are configured to be positioned against other blocks of foam.

In one or more implementations, the sides that are configured to be positioned at least partially against the sidewalls of the tire are wedge shaped such that the sides are narrower at an apex portion than at a lower portion that is configured to contact the sidewalls of the tire. The sides that are configured to be positioned against the other blocks of foam may also be wedge shaped. For example, sides that are configured to be positioned against the other blocks of foam are narrower at the apex portion than at the lower portion disposed within the sidewalls of the tire.

In one or more implementations, the plurality of blocks of foam configured to substantially fill a space defined inside the tire each have the same shape. These foam blocks may have a rigidity that is not only sufficient to operate the tire without air pressure, but also enables the blocks to be compressed from an original wedge shape into a compressed wedge shape.

In one or more implementations, a plurality of foam blocks configured to substantially fill an inside of a tire is lubricated. At least some of the blocks may be positioned inside the tire. These foam blocks may be spread to form a space for foam blocks that have yet to be positioned within the tire. In this way, one or more of the foam blocks that have not yet been positioned inside the tire may be positioned in the space formed by the spreading.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIGS. 3A, 3B, and 3C are illustrations of a block in an example implementation showing a three-dimensional view of the block and views from the sides of the block, which may be configured in accordance with one or more of the previously described blocks of FIGS. 1, 2A, and 2B.

FIG. 5 is a flow diagram depicting a procedure in an example implementation that is used to substantially fill an inside of a tire with blocks of foam to operate the without air pressure.

DETAILED DESCRIPTION

Overview

Figure 1:
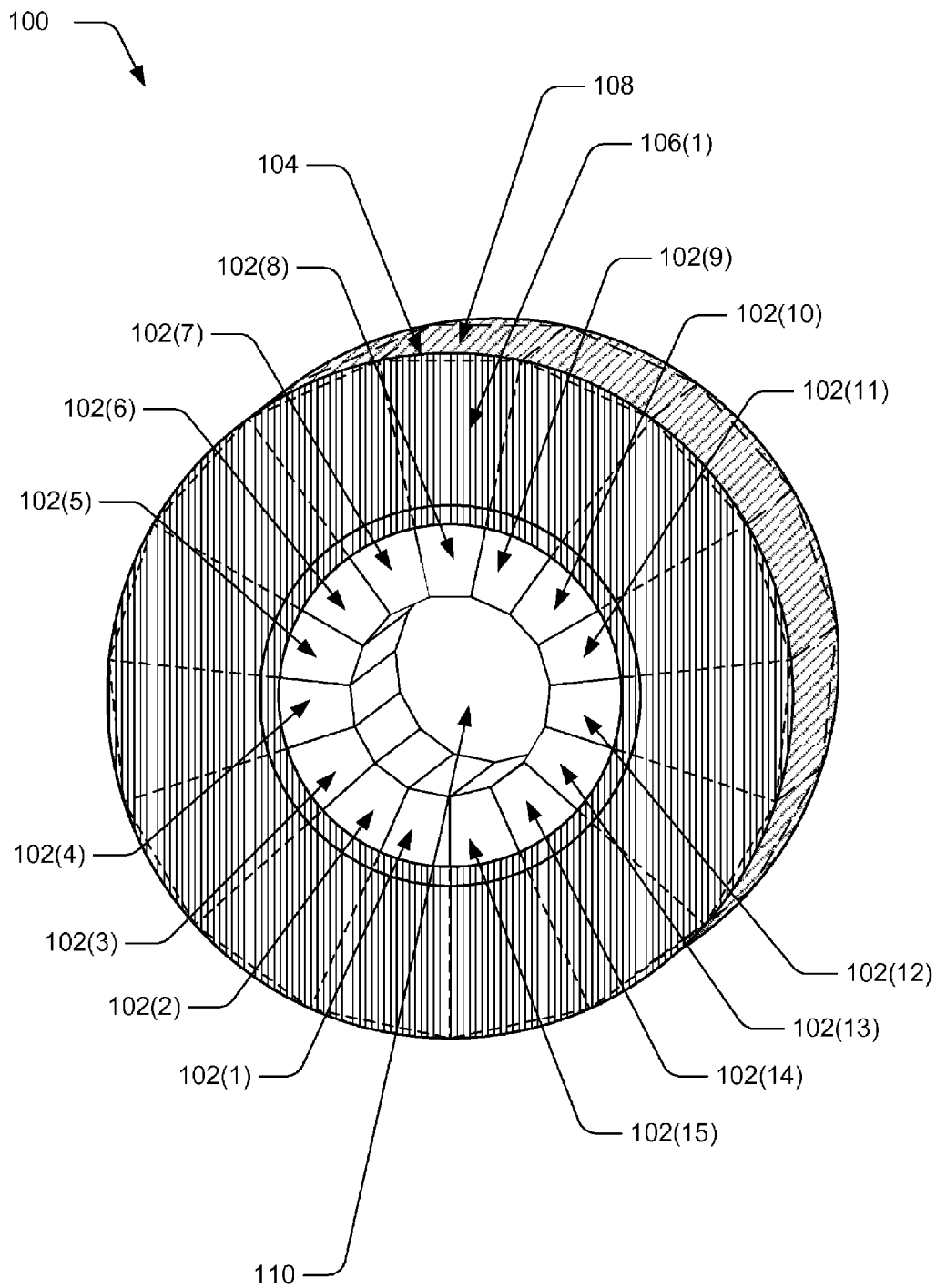
FIG. 1 is an illustration of an apparatus in an example implementation in which a plurality of blocks of foam substantially fill an inside of a tire.

Some objects present on roadways and on other paths taken by a vehicle are capable of puncturing tires of the vehicle. When a tire is punctured by such objects, the tire may lose the ability, in some cases suddenly and in other cases over an extended period of time, to maintain sufficient air pressure for operation of the tire. In both types of cases such air loss may result in a "flat tire," a dangerous condition that may damage the vehicle and could result in a harmful situation for occupants of the vehicle. Even if a flat tire does not cause a particularly dangerous condition, fixing and/or replacing a compromised tire is simply undesirable. To prevent a compromised tire from losing its suitability to operate normally, objects may be inserted into the tire when it is installed on a vehicle (e.g., before the tire is used). Many conventional inserts, however, are designed as a temporary solution. Such inserts may enable the vehicle with the compromised tire to travel to a location where the tire can be fixed and where air pressure can be restored. For example, one approach may be to fill a tire with multiple air bladders. However, the air bladders may have problems at high speeds. Additionally, when a tire is punctured, one or more of the air bladders used to fill the tire may also be punctured. Consequently, unpunctured air bladders may be relied upon to fill in the space left by the punctured air bladders. As a result, the space may not be filled as tightly as when all of the bladders are operable, which may cause an out of balance condition in which the tire vibrates. Other conventional approaches may also fail to fill the space within the tire, such as when the insert material deteriorates as the vehicle is driven. In still other approaches, the inserts may not deteriorate, but may fill only a portion of the tire. These other conventional approaches may also cause the out of balance condition described above. Over an extended period of time, vibrations resulting from this condition may not only damage the vehicle, but may also cause further damage to the tire. For at least these reasons, many conventionally-designed tire inserts make continued operation of the tire under normal conditions unfeasible.

Tire blocks are disclosed herein that may be used to maintain operation ability of a tire when a tire has been compromised, e.g., when the tire loses air pressure. In one or more implementations, the tire blocks are formed from industrial foam cut into wedge shaped pieces. These pieces may be shaped such that when inserted into a tire, the inside of the tire is uniformly filled. Silicone may be inserted between the foam pieces to lessen the results of friction on the foam. The tire can then be inflated to the desired air pressure for operation. Because of the density of the foam and its wedge shaped design a failed tire can still be used for normal operation.

Another benefit from using foam is that it is not dependent on air in any way unlike some of the conventional techniques described above. Consequently, these techniques may be used at high speeds, which may make these techniques employable in high-stress environments, such as for racing vehicles. In high-stress environments like long distance racing, being able to continue using a compromised tire may make a significant difference in race results as there is no need to actually change a failed tire using these techniques.

In the following discussion, tire blocks are described by way of example as being used in a tire that may be installed on vehicle, such as being operably attached to a rim of the vehicle. However, it should be readily apparent that the following discussion is not limited to a particular vehicle, a particular tire that corresponds to the particular vehicle, or attaching such a tire to a rim of the vehicle. Accordingly, these techniques may have a variety of applications, such as for automobiles, motorcycles (e.g., road or motocross), ATVs, UTVs, rock crawlers, sand rails, military vehicles, industrial vehicles, human-powered vehicles (e.g., bicycles), airplanes, and so on.

Example Apparatus

FIG. 1 is an illustration of an apparatus 100 in an example implementation in which a plurality of blocks of foam substantially fill an inside of a tire. The illustrated apparatus includes multiple foam blocks 102(1)-102(15) that are inserted within tire 104. The foam blocks 102(1)-102(15) have a shape and rigidity such that when inserted into the tire 104, the foam blocks substantially fill an inside of the tire 104. For example, the foam blocks 102(1)-102(15) may fill a space inside of the tire 104 that is defined, at least in part, by sidewalls 106(1), 106(2) of the tire 104 (sidewall 106(2) is not shown in the illustrated example) and an inner surface adjacent to tread 108 of the tire 104.

In the illustrated example, sidewall 106(1) and tread 108 are shown as distinct surfaces. It should be noted however, that in some implementations tire 104 may have a curved shape such that the sidewalls 106(1), 106(2) blend into the tread 108 of the tire 104. In other words, the sidewalls 106(1), 106(2) may not appear to be distinct surfaces from the tread 108 the tire 104. It should be readily apparent that tire 104 may have a variety of different shapes, with which the techniques described herein may be applied. Consequently, the foam blocks 102(1)-102(15) may be shaped to uniformly fill the inside of a variety of differently shaped tires. For example, an ATV, a road bicycle, and an airplane have differently shaped tires. Accordingly, foam blocks used to fill the tire of an ATV may be shaped differently than foam blocks used to fill the tire of a road bicycle or foam blocks used to fill the tire of an airplane.

It should also be noted that the number of foam blocks used to fill the inside of a tire may also vary. Although the tire 104 is shown with fifteen (15) foam blocks (foam blocks 102(1)-102(15)), the number of blocks used to uniformly fill the inside of the tire may be greater or less than fifteen (15). In some implementations, for instance, twelve (12) foam blocks may be sufficient to fill the space defined inside of the tire 104. In other implementations, seventeen (17) foam blocks may be sufficient to fill the space defined inside of the tire 104. In still other implementations, a number of foam blocks that is greater than twelve (12) foam blocks, but less than seventeen (17) foam blocks may be sufficient to fill the space defined inside of the tire 104. In some conventional approaches, difficulties may be attendant with positioning a sufficient number of inserts within a tire to substantially fill the space defined by the inside of the tire.

In one or more implementations, the foam blocks 102(1)-102(15) may have a wedge shape. For example, a foam block (e.g., foam block 102(1)) may have a shape that is wedged such that sides of the foam block, positioned at least partially against sidewalls 106(1), 106(2) of the tire 104, are wedged. Additionally, foam block 102(1) may have a shape that is wedged such that sides of the foam block, positioned against adjacent foam blocks (e.g., foam blocks 102(2), 102(15)), are wedged. In this example, foam blocks 102(2)-102(15) may each have a wedge shape that is substantially the same as foam block 102(1).

In the illustrated example, the foam blocks 102(1)-102(15) are shown extending beyond the sidewalls 106(1), 106(2) and into an opening 110 of the tire 104. Once the tire 104 is installed on a vehicle, portions of the foam blocks 102(1)-102(15) that extend into the opening 110 of the tire 104 may be positioned against a rim on which the tire operates. In this way, each of the foam blocks 102(1)-102(15) may be positioned at least partially against the rim on which the tire 104 operates, at least two other foam blocks, the sidewalls 106(1), 106(2), and an inner surface of the tire 104 that is adjacent to the tread 108.

One of the challenges attendant with designing tire inserts that maintain operability of the tire is to make inserts that do not deteriorate with use of the tire and enable the tire to be filled with a sufficient number of inserts. Some conventional approaches to tire insert construction called for using heavy-duty materials. Although such inserts may not deteriorate, the heavy-duty materials did not compress enough so that a tire could be substantially filled with conventionally-designed blocks. In other conventional approaches, inserts made from Styrofoam-like material were used within tires. However, such inserts were subject to rapid deterioration. As previously described, an out of balance condition may result from both of these approaches, making continued operation of the tire unfeasible. Foam blocks 102(1)-102(15), however, may be made from a material having a rigidity that enables a sufficient number of blocks to be positioned within the tire 104 so that it is uniformly filled. Further, the rigidity of the material is sufficient to maintain operability of the tire in high-stress environments without positive air pressure.

As one example, each of the foam blocks 102(1)-102(15) may be made from a lightweight industrial foam, such as a closed cell crosslinked polyethylene bun foam. Using a lightweight foam enables the foam blocks 102(1)-102(15) to be compressed from an original shape into a compressed shape, such as from an original wedge shape into a compressed wedge shape. The lightweight foam also enables the foam blocks 102(1)-102(15) to press up against one another. By using a same material having a same rigidity for each of the foam blocks 102(1)-102(15), the space defined inside the tire 104 may be uniformly filled. The closed cell crosslinked polyethylene bun foam also has a rigidity that enables a tire filled with such foam to maintain operability.

Additionally, the material from which the foam blocks are made may be capable of absorbing shock and protecting against vibration. Thus, the material may prevent the out of balance condition described above, which can cause potentially damaging vibrations. Further, the material may also protect from electric static thereby preventing other damage that may be attendant with a compromised tire.

In one or more implementations, the foam blocks 102(1)-102(15) may be lubricated to increase the durability of the blocks. For example, DiMethylPolySiloxane Silicone may be inserted between the foam blocks 102(1)-102(15) to lubricate the foam blocks. The lubricant may permeate through the foam blocks 102(1)-102(15) and lessen the result of friction on the foam. Additionally, the lubricant may enable a number of foam blocks to be positioned within a tire that is sufficient to substantially fill the inside of the tire.

Figure 2A:
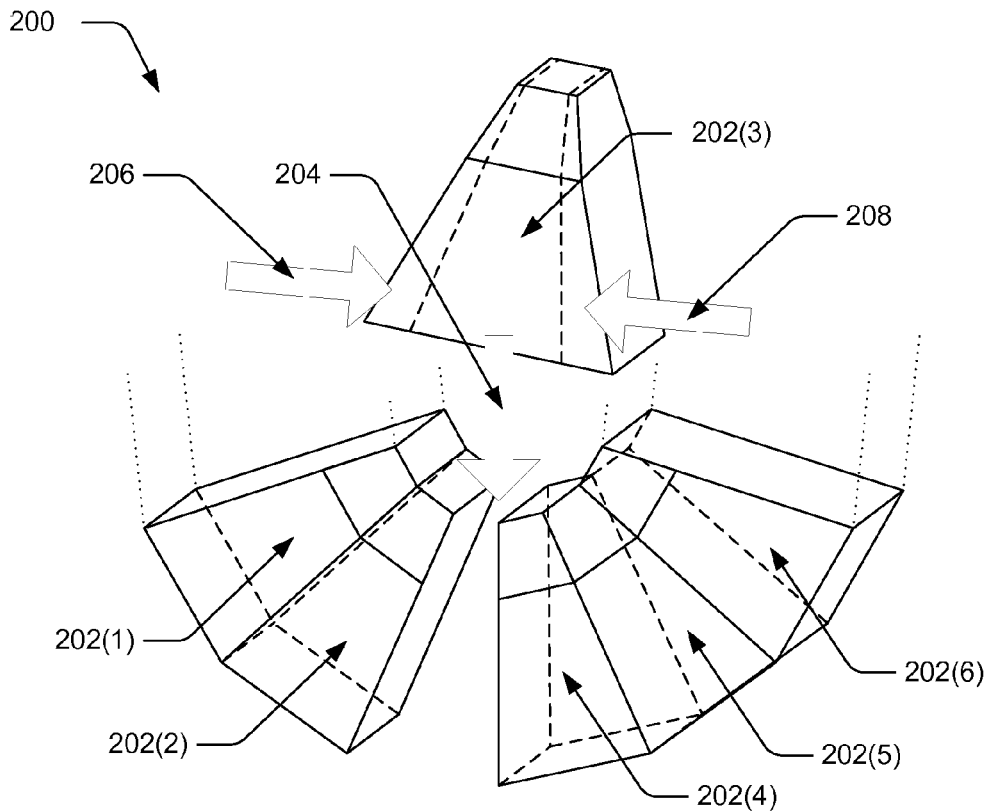
FIG. 2A is an illustration of tire blocks in an example implementation depicting some blocks of foam, including one block of foam that is uncompressed and is not positioned with other already positioned blocks of foam.

FIG. 2A is an illustration of tire blocks in an example implementation depicting some blocks of foam, including one block of foam that is uncompressed and is not positioned with other already positioned blocks of foam. Blocks 202(1)-202(6) may correspond to any six adjacently positioned foam blocks 102(1)-102(15) of FIG. 1. In the illustrated example, blocks 202(1), 202(2), 202(4), 202(5), 202(6) may already be positioned within a tire. Block 202(3), however, is depicted uncompressed and not yet positioned with the other blocks (and not positioned within the tire).

Before being positioned among the already positioned blocks 202(1), 202(2), 202(4), 202(5), 202(6), block 202(3) may have an uncompressed wedge shape (illustrated by the solid lines of block 202(3)). When block 202(3) is positioned between blocks 202(2), 202(4), however, block 202(3) may be compressed from the original wedge shape into a compressed wedge shape (illustrated by the dashed lines of block 202(3)). In the illustrated example, arrow 204 indicates a direction in which block 202(3) may be inserted among the already positioned blocks 202(1), 202(2), 202(4), 202(5), 202(6). Arrows 206, 208 indicate a direction in which block 202(3) may be compressed. For example, the already positioned blocks 202(1), 202(2), 202(4), 202(5), 202(6) may press up against block 202(3) and cause block 202(3) to be compressed laterally in the direction of arrows 206, 208.

FIG. 2A also depicts a plurality of dotted lines that extend from the already positioned blocks 202(1), 202(6). These lines indicate other blocks that are not shown in this particular example, but may be positioned adjacent to the already positioned blocks 202(1), 202(6).

Figure 2B:
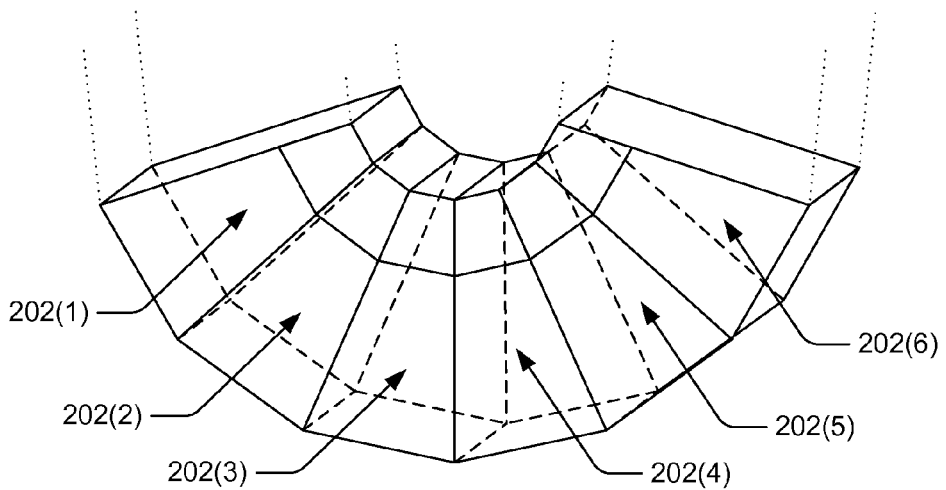
FIG. 2B is an illustration of tire blocks in an example implementation depicting the blocks of foam shown in FIG. 2A, and in which the previously unpositioned one block of foam is positioned with the other already positioned blocks of foam.

FIG. 2B is an illustration of tire blocks in an example implementation depicting the blocks of foam shown in FIG. 2A, and in which the previously unpositioned one block of foam is positioned with the other already positioned blocks of foam. In this example, block 202(3) has been positioned among the already positioned blocks 202(1), 202(2), 202(4), 202(5), 202(6). As a result of the positioning, block 202(3) is compressed from the original wedge shape. Instead, block 202(3) is shown having a compressed wedge shape. To substantially fill a tire, each of the tire blocks positioned within a tire may be compressed from an original wedge shape into a compressed wedge shape.

FIGS. 3A, 3B, and 3C are illustrations of a block in an example implementation showing a three-dimensional view of the block and views from the sides of the block, which may be configured in accordance with one or more of the previously described blocks of FIGS. 1, 2A, and 2B. The illustrated views depict block 300 having an original uncompressed wedge shape. Block 300 may correspond to any one of foam blocks 102(1)-102(15) that fill the tire 104. Thus, each of the foam blocks 102(1)-102(15) may have the same shape as block 300.

In this example, view 302 of FIGS. 3A-3C depicts a three-dimensional view of block 300. In particular, view 302 shows side 304 and side 306 of block 300. Respective views of side 304 and side 306 are depicted below view 302. In implementations, side 304 of block 300 may be positioned at least partially against a sidewall of a tire, such as against sidewalls 106(1) or 106(2) of the tire 104 shown in FIG. 1. As shown in view 302, side 304 is disposed adjacent to side 306. In implementations, side 306 may be positioned against another foam block used to fill the inside of a tire. Although they are not shown, block 300 also has opposing sides. One of these opposing sides opposes side 304 and has a shape similar to that of side 304. The other opposing side opposes side 306 and has a shape similar to that of side 306.

As shown in FIGS. 3A-3C, an apex portion 308 of block 300 may be narrower than a lower portion 310 of block 300. In this example, the side 304 of block 300 that may be positioned against a sidewall of a tire may be narrower at the apex portion 308, than at the lower portion 310 where the side contacts the sidewall of the tire. Further, the side 306 of block 300 that may be positioned against another blocks may also be narrower at the apex portion 308, than at the lower portion 310, which may be disposed within the sidewalls of the tire.

Additionally, the apex portion 308 of block 300 may extend beyond the sidewalls of a tire and into an opening of a tire, such as into the opening 110 of the tire 104. In one or more implementations, the apex portion 308 of block 300 may be positioned against a rim on which the tire is configured to operate. Consequently, block 300 may fill a space between the rim on which the tire is configured to operate and an inner surface of the tire that is adjacent to tread of the tire. When block 300 is positioned within a tire, a base portion 312 of block 300 may be positioned against the inner surface of the tire adjacent to the tread.

Figure 4A:
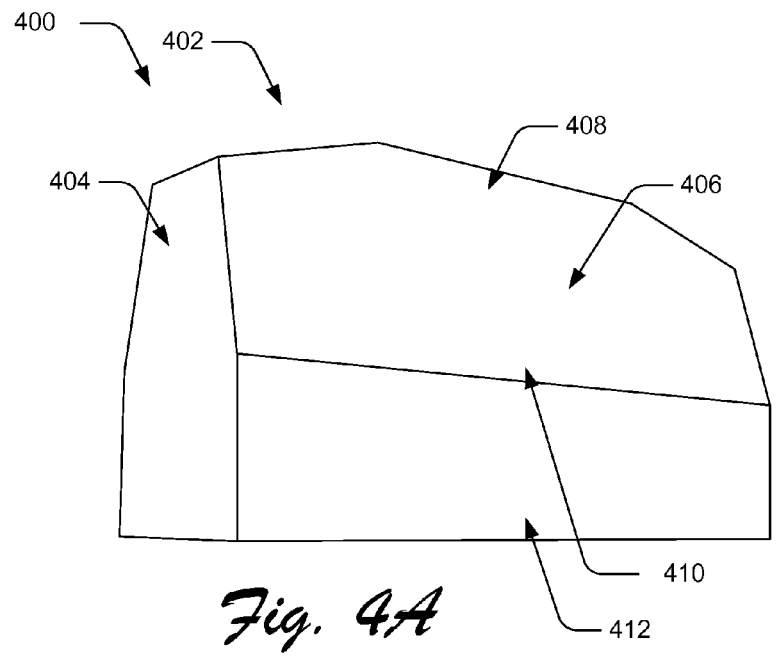
FIGS. 4A, 4B, and 4C are illustrations of a different block than the block shown in FIG. 3 in an example implementation showing a three-dimensional view of the block and views from the side of the block, which may be configured in accordance with one or more of the previously described blocks of FIGS. 1, 2A, and 2B.
Figures 4B, 4C:
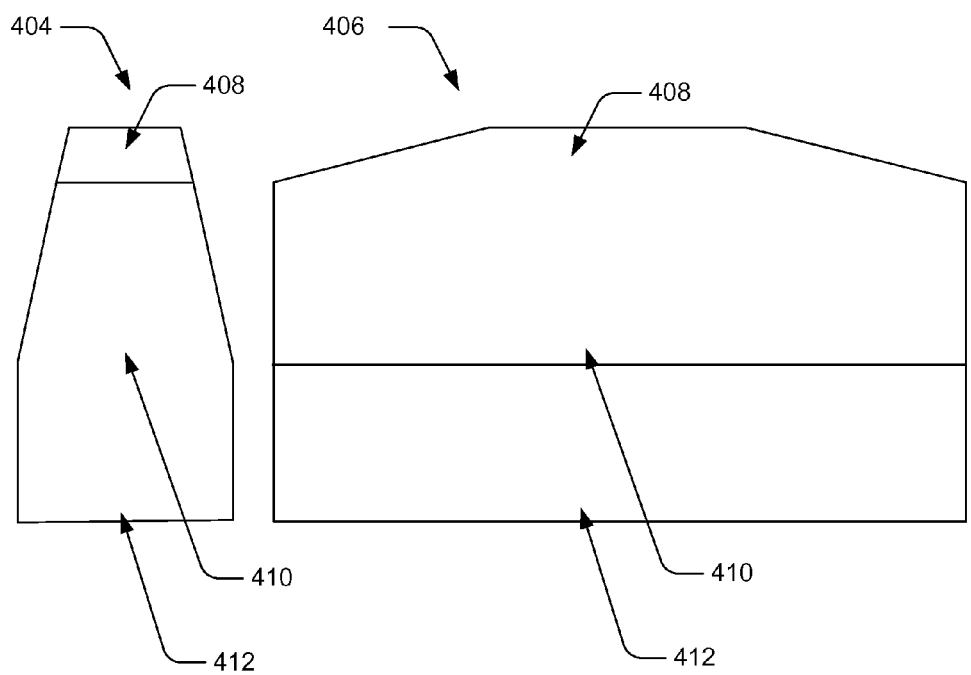

FIGS. 4A, 4B, and 4C are illustrations of a different block than the block shown in FIG. 3 in an example implementation showing a three-dimensional view of the block and views from the side of the block, which may be configured in accordance with one or more of the previously described blocks of FIGS. 1, 2A, and 2B. The illustrated views depict block 400 having an original uncompressed wedge shape. Block 400 has a different shape than block 300, and may thus be used to fill a tire that is shaped differently than a tire filled by blocks shaped like block 300. In one example, blocks shaped like block 300 may be used to fill front tires of a vehicle and blocks shaped like block 400 may be used to fill rear tires of the vehicle. In another example, blocks shaped like block 300 may be used to fill tires of a first vehicle and blocks shaped like block 400 may be used to fill tires of a different vehicle.

In this example, view 402 depicts a three dimensional view of block 400. In particular, view 402 shows side 404 and side 406 of block 400. Respective views of side 404 and side 406 are depicted below view 402. In implementations, side 404 of block 400 may be positioned at least partially against a sidewall of a tire. As shown in view 402, side 404 is disposed adjacent to side 406. In implementations, side 406 may be positioned against another foam block used to fill the inside of a tire.

As shown in FIG. 4A-C, an apex portion 408 of block 400 may be narrower than a lower portion 410 of block 400. In this example, side 404 of block 400 that may be positioned against a sidewall of a tire may be narrower at the apex portion 408, than at the lower portion 410 where the side contacts the sidewalls of the tire. Further, the side 406 of block 400 that may be positioned against another block may also be narrower at the apex portion 408, than at the lower portion 410, which may be disposed within the sidewalls of the tire.

Additionally, the apex portion 408 of block 400 may extend beyond the sidewalls of a tire and into an opening of a tire. In one or more implementations, the apex portion 408 of block 400 may be positioned against a rim on which the tire is configured to operate. Consequently, block 400 may fill a space between the rim on which the tire is configured to operate and an inner surface of the tire that is adjacent to tread of the tire. When block 400 is positioned within a tire, a base portion 412 of block 400 may be positioned against the inner surface of the tire that is adjacent to the tread.

Example Procedures

The following discussion describes procedures that may be implemented utilizing previously described apparatuses, techniques, and approaches. The procedures are shown as a set of blocks that specify operations and are not necessarily limited to the orders shown for performing the operations by the respective blocks. In portions of the following discussion, reference will be made to the apparatus 100 of FIG. 1 and the tire blocks described above.

FIG. 5 depicts a procedure 500 in an example implementation in which a tire is substantially filled with wedged foam blocks to operate the tire without air pressure. In one or more implementations, the wedged foam blocks may be made of a material having a rigidity that enables the blocks to compress from an original uncompressed wedge shape into a compressed wedge shape to substantially fill the tire. The wedged foam blocks used to fill a single tire may each have substantially a same wedge shape and a same rigidity. The rigidity may be sufficient to maintain operability of the tire without positive air pressure.

Wedge shaped foam blocks that are configured to fill the inside of a tire are lubricated (block 502). For example, the foam blocks 102(1)-102(15) depicted in FIG. 1 may be lubricated. In one or more implementations, the foam blocks 102(1)-102(15) may be lubricated with DiMethylPolySiloxane Silicone to enable each of the blocks to be positioned within the tire 104. Lubricating the foam blocks 102(1)-102(15) may also lessen the result of friction on the foam.

At least some of the foam blocks may be positioned within a space defined inside the tire (block 504). For example, foam blocks 102(2)-102(15) may be positioned within a space inside of tire 104. The space inside of tire 104 may be defined by the sidewalls 106(1), 106(2) and an inner surface of the tire 104 adjacent to the tread 108.

The foam blocks that are positioned within the tire may be spread to form a space for foam blocks that have yet to be positioned in the tire (block 506). For example, foam blocks 102(2)-102(15) may be spread to form a space for foam block 102(1). Without foam block 102(1) positioned in the tire and prior to the spreading, the foam blocks 102(2)-102(15) may have an uncompressed wedge shape. However, the spreading may cause the foam blocks 102(2)-102(15) to take a compressed wedge shape. By compressing the foam blocks 102(2)-102(15), space may be formed within the tire to position foam block 102(1).

Foam blocks may be positioned in the space formed by the spreading (block 508). In the continuing example, foam block 102(1) may be positioned in the space formed by spreading foam blocks 102(2)-102(15). To position foam block 102(1) within the tire, however, foam block 102(1) may also be compressed from its original wedge shape into a compressed wedge shape. In this way, each of the foam blocks 102(1)-102(15) may be positioned to substantially fill the inside of a tire, such that operability may be maintained.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. An apparatus comprising:
   a plurality of blocks of foam configured to substantially fill an inside of a tire, each of the blocks of foam having:
      a generally wedge shape having sides that are configured to be positioned at least partially against sidewalls of the tire or configured to be positioned against other said blocks, in which the sides configured to be positioned at least partially against sidewalls of the tire have an apex portion having a linear surface joined with a lower portion having another linear surface disposed at different angles, one to another; and
      a rigidity that is sufficient to operate the tire without air pressure.

2. An apparatus as described in claim 1, wherein the sides that are configured to be positioned at least partially against the sidewalls are narrower at an apex portion than at a lower portion that is configured to contact the sidewalls of the tire.

3. An apparatus as described in claim 1, wherein the sides that are configured to be positioned against the other said blocks are narrower at an apex portion than at a lower portion configured to be disposed within the sidewalls of the tire.

4. An apparatus as described in claim 1, wherein the wedge shape of each said block is compressed from an original wedge shape to substantially fill the inside of the tire with said blocks of foam.

5. An apparatus as described in claim 1, wherein each of the plurality of blocks of foam has a substantially same wedge shape.

6. An apparatus as described in claim 1, wherein the plurality of blocks of foam that is sufficient to substantially fill a space defined inside of the tire comprises at least 12 blocks of foam.

7. An apparatus as described in claim 1, wherein the plurality of blocks of foam that is sufficient to substantially fill a space defined inside of the tire comprises 17 or fewer blocks of foam.

8. An apparatus as described in claim 1, wherein the rigidity enables each of the blocks of foam to be compressed from an original wedge shape into a compressed wedge shape.

9. An apparatus as described in claim 1, wherein the foam comprises a lightweight foam configured to at least one of:
    absorb shock;
    protect from vibration; and
    protect from electric static.

10. An apparatus as described in claim 1, further comprising a lubricant configured to permeate through the foam and lubricate the plurality of blocks to enable a number of said blocks that is sufficient to substantially fill the inside of the tire to be positioned within the inside of the tire.

11. An apparatus comprising:
    a tire having a space defined inside the tire;
    a plurality of foam blocks configured to fill the space, each foam block having:
        a same generally wedge shape as other said foam blocks having sides configured to be positioned at least partially against sidewalls of the tire that include a lower portion joined with an apex portion, the apex portion extending through an opening of the tire; and
        a same rigidity as the other said foam blocks, said rigidity is sufficient to operate the tire without air pressure.

12. An apparatus as described in claim 11, wherein the same wedge shape is different for differently shaped tires.

13. An apparatus as described in claim 11, wherein the same wedge shape has wedge shaped sides that are configured to be positioned at least partially against sidewalls of the tire or configured to be positioned against at least two of the other said foam blocks.

14. An apparatus as described in claim 13, wherein the wedge shaped sides that are configured to be positioned at least partially against the sidewalls are narrower at an apex portion than at a lower portion that is configured to contact the sidewalls of the tire.

15. An apparatus as described in claim 13, wherein the wedge shaped sides that are configured to be positioned against the at least two other said foam blocks are narrower at an apex portion than at a lower portion that is configured to be disposed within the sidewalls of the tire.

16. An apparatus as described in claim 11, wherein the apex portion of each said foam block is configured to extend beyond the sidewalls of the tire and into the opening of the tire.

17. An apparatus as described in claim 11, wherein a base portion of each said foam block is configured to be positioned against an inner surface of the tire that is adjacent to tread of the tire and an apex portion of each said foam block is configured to be positioned against a rim on which the tire is configured to operate.

18. A method comprising:
    lubricating a plurality of generally wedge shaped foam blocks that are configured to substantially fill an inside of a tire having sides that are configured to be positioned against each other and have an apex portion having a surface joined with a lower portion having another surface disposed at different angles, one to another, and have a rigidity that is sufficient to operate the tire without positive air pressure;
    positioning at least some said foam blocks within the inside of the tire;
    spreading the at least some said foam blocks to form space for one or more other said foam blocks, the spreading causing the at least some said foam blocks to be compressed; and
    positioning the one or more other said foam blocks in the space formed by the spreading.

19. A method as described in claim 18, wherein the one or more other said foam blocks are configured to be compressed to position the one or more other said foam blocks in the space formed by the spreading.

20. A method as described in claim 18, wherein the plurality of wedge shaped foam blocks have a substantially same shape.

\* \* \* \* \*